(12) United States Patent
Fang et al.

(10) Patent No.: US 10,557,733 B2
(45) Date of Patent: Feb. 11, 2020

(54) MULTI-CHANNEL ULTRASONIC FLOW METER

(71) Applicant: QINGDAO HIWITS METER CO., LTD., Qingdao (CN)

(72) Inventors: Xin Fang, Qingdao (CN); Xinxing Li, Qingdao (CN)

(73) Assignee: QINGDAO HIWITS METER CO., LTD., Qingdao (CN)

( * ) Notice: Subject to any disclaimer, the term of this patent is extended or adjusted under 35 U.S.C. 154(b) by 0 days.

(21) Appl. No.: 16/330,443

(22) PCT Filed: Oct. 13, 2017

(86) PCT No.: PCT/CN2017/106149
§ 371 (c)(1),
(2) Date: Mar. 5, 2019

(87) PCT Pub. No.: WO2018/133463
PCT Pub. Date: Jul. 26, 2018

(65) Prior Publication Data
US 2019/0346299 A1     Nov. 14, 2019

(30) Foreign Application Priority Data

Jan. 23, 2017  (CN) .................... 2017 2 0098989 U

(51) Int. Cl.
*G01F 1/66*     (2006.01)
(52) U.S. Cl.
CPC .................... *G01F 1/662* (2013.01)
(58) Field of Classification Search
CPC .......... G01F 1/66; G01F 1/662; Y10T 292/48; Y10T 292/507
See application file for complete search history.

(56) References Cited

U.S. PATENT DOCUMENTS

| | | | | |
|---|---|---|---|---|
| 8,776,613 B2* | 7/2014 | Dietz | ..................... | G01F 1/662 |
| | | | | 73/861.28 |
| 2008/0307911 A1* | 12/2008 | Allen | ..................... | G01F 1/662 |
| | | | | 73/866.1 |

(Continued)

FOREIGN PATENT DOCUMENTS

| CN | 202420578 U | 9/2012 |
|---|---|---|
| CN | 103868628 A | 6/2014 |

(Continued)

*Primary Examiner* — Nathaniel J Kolb
(74) *Attorney, Agent, or Firm* — SZDC Law P.C.

(57) ABSTRACT

A multi-channel ultrasonic flowmeter includes transducer assemblies (21, 22, 23, 24) and a pipe housing (10). Four transducer assembly installation holes (9) arranged at two ends of the pipe housing (10) close to flanges (4). The transducer assemblies (21, 22, 23, 24) are provided in the installation holes (9). The transducer assemblies (21, 22, 23, 24) includes transducers (7) and stationary posts (1). An upper portion of the stationary post (1) has a first cylindrical body (109). A lower portion of the stationary post (1) has a flat key-shaped protrusion (105) extending in an axial direction. The flat key-shaped position-limiting protrusion (105) limits rotation of the stationary post (1) around an axial thereof, and ensures accurate positioning of the axis of the stationary post (1). The transducer (7) and the stationary post (1) are respectively sealed to prevent leakage of a fluid. The multi-channel ultrasonic flow meter provides a thorough solution about fixed installation, positioning and sealing of the transducer (7), has a compact structure, can be installed conveniently, and has good sealing performance.

2 Claims, 6 Drawing Sheets

(56) References Cited

U.S. PATENT DOCUMENTS

| | | | | |
|---|---|---|---|---|
| 2010/0005901 A1* | 1/2010 | Groeschel | | G01F 1/667 73/861.27 |
| 2010/0242590 A1* | 9/2010 | Day | | G01F 1/667 73/204.22 |
| 2011/0162463 A1* | 7/2011 | Allen | | G01F 1/662 73/861.18 |
| 2013/0098167 A1* | 4/2013 | McDonald | | G01F 1/667 73/861.18 |
| 2013/0219707 A1* | 8/2013 | Sui | | G01F 1/662 29/729 |
| 2013/0291649 A1* | 11/2013 | Groeschel | | G01F 1/667 73/861.18 |
| 2013/0294475 A1* | 11/2013 | Derr | | G01F 1/7082 374/1 |
| 2014/0083181 A1* | 3/2014 | McDonald | | G01D 11/30 73/273 |
| 2014/0103274 A1* | 4/2014 | McDonald | | G01F 1/662 254/134.3 R |
| 2014/0109645 A1* | 4/2014 | Ramsay | | G01F 1/66 73/1.34 |
| 2014/0109686 A1* | 4/2014 | Ramsay | | G01F 1/66 73/861.18 |
| 2014/0109687 A1* | 4/2014 | Ramsay | | G01F 1/66 73/861.27 |
| 2014/0109689 A1* | 4/2014 | Ramsay | | G01F 1/66 73/861.28 |
| 2014/0109690 A1* | 4/2014 | Ramsay | | G01F 1/66 73/861.28 |
| 2014/0111342 A1* | 4/2014 | Ramsay | | G01F 1/662 340/606 |
| 2014/0238148 A1* | 8/2014 | Priyadarshana | | G01F 1/662 73/861.28 |
| 2014/0260670 A1* | 9/2014 | Strom | | G01F 1/42 73/861.42 |
| 2015/0000420 A1* | 1/2015 | Ramsay | | G01K 15/007 73/861.01 |
| 2015/0136842 A1* | 5/2015 | Allen | | G01F 1/662 228/219 |
| 2015/0268077 A1* | 9/2015 | Mezheritsky | | B01B 1/00 73/861.28 |
| 2016/0282160 A1* | 9/2016 | Mezheritsky | | G01F 1/667 |
| 2019/0128714 A1* | 5/2019 | Zarkan | | B06B 1/0607 |
| 2019/0186967 A1* | 6/2019 | Priyadarshana | | G01F 25/0007 |

FOREIGN PATENT DOCUMENTS

| | | |
|---|---|---|
| CN | 204313901 U | 5/2015 |
| CN | 205537791 U | 8/2016 |
| CN | 206440316 U | 8/2017 |
| JP | 4793916 B2 | 10/2011 |

* cited by examiner

MULTI-CHANNEL ULTRASONIC FLOW METER

This application is the National Stage Application of PCT/CN2017/106149, filed on Oct. 13, 2017, which claims priority to Chinese Patent Application No.: 201720098989.3, filed on Jan. 23, 2017, which is incorporated by reference for all purposes as if fully set forth herein.

BACKGROUND OF THE INVENTION

1. Technical Field

The invention belongs to the technical field of fluid metering, and particularly relates to a multi-channel ultrasonic flowmeter.

2. Description of Related Art

Ultrasonic flowmeters have been widely applied to the field of industrial flow metering of large-diameter heat meters, large-diameter water meters and the like. For the sake of more accurate flow metering, as well as safe and reliable flow metering, the installation structure of transducers of large-diameter ultrasonic flowmeters is changing all the time. The previous installation method where a pair of transducers is angled with respect to the fluid flow direction of the flowmeters is being gradually replaced with the installation method where the transducers are perpendicular to the fluid flow direction. For instance, Chinese Patent Authorization Publication No. CN 204330187U discloses a novel large-diameter ultrasonic heat meter which is provided with transducer installation bases arranged perpendicular to the fluid flow direction. This structure transformation increases the distance from the connection wires between two pairs of transducers to projections in the fluid direction and improves the accuracy and range ratio of the flowmeter. Due to the fact that the ultrasonic flowmeters are difficult to maintain, repair, and replace during use, a plurality of pairs of symmetrical transducers are usually adopted for standby application during engineering, so as to meet the high reliability requirements for the ultrasonic flowmeters. For instance, Chinese Patent CN 202770480U discloses an ultrasonic flow sensor provided with two sets of symmetrical transducers (each set includes two pairs of transducers). Through the symmetrical design, one set of the transducers can be used as standbys, so that the reliability of the flow sensor is greatly improved. In addition, these two ultrasonic flowmeters adopt silica gel for lateral sealing or adopt silica gel gaskets for sealing; however, practice has proved that such sealing elements are prone to aging and turn inflexible, resulting in leakage when used in high-temperature environments for a long time, and consequentially, the service life of the ultrasonic flowmeters is drastically shortened.

BRIEF SUMMARY OF THE INVENTION

Due to the fact that convenient installation of transducers, the durability and height of sealing elements, and angle positioning accuracy are of great importance for their direct influences on metering accuracy, and that sealing of the transducers is a precondition for ensuring lasting accurate metering, the invention puts forwards a thorough solution about installation, positioning, and sealing of the transducers by providing a multi-channel ultrasonic flowmeter.

A multi-channel ultrasonic flowmeter comprises transducer assemblies and a pipe housing, wherein flanges are separately arranged at two ends of the pipe housing and are provided with bolt holes, and four transducer assembly installation holes are formed in the two ends of the pipe housing close to the flanges.

Each transducer assembly comprises two transducers and a stationary post, wherein two first installation holes are formed in the middle of the stationary post, and the two transducers are installed in the first installation holes.

Each transducer assembly further comprises a circular compression piece and an elastic ring, protrusions extending outwards in a radial direction are symmetrically formed on two sides of each circular compression piece, first installation faces are formed in the first installation holes, the first installation holes are formed with second circular grooves and second rectangular grooves, bosses are arranged at transmitting ends of the transducers, the other ends of the transducers are attached to the first installation faces, the circular compression pieces are installed in the first installation holes, the protrusions are arranged in the second circular grooves, and the elastic rings are installed in the second circular grooves.

First sealing gaskets are arranged between the first installation faces and the transducers.

Upper portions of the stationary posts are provided with first cylindrical bodies, lower portions of the stationary posts are provided with flat key-shaped protrusions extending in an axial direction, and first positioning step surfaces are formed between the protrusions and bodies of the stationary posts. The transducer assembly installation holes comprise first round holes and key grooves, the first round holes are located on upper portions of the transducer assembly installation holes, bottom ends of the transducer assembly installation holes are formed with the key grooves and are provided with second positioning step surfaces, and the key grooves are matched with the protrusions.

The upper portions of the transducer assembly installation holes are broached to form second round holes, and third positioning step surfaces are formed between the second round holes and the first round holes.

The multi-channel ultrasonic flowmeter further comprises second sealing rings, polytetrafluoroethylene gaskets and compression rings, wherein the compression rings are in threaded connection with the second round holes and press the polytetrafluoroethylene gaskets against upper end faces of the stationary posts and the third positioning step surfaces through disc springs, circular grooves are formed in the first round holes, and the second sealing rings are arranged in the circular grooves.

The multi-channel ultrasonic flowmeter further comprises a circuit box arranged outside the pipe housing, wherein an integrator is arranged in the circuit box, a wire hole and four wiring holes are formed in the pipe housing, the wire hole is perpendicular to the pipe housing and is communicated with the circuit box, the four transducer assembly installation holes are communicated with the wire hole via the four wiring holes, and wire guide holes are formed in the upper portions of the stationary posts and are communicated with the first installation holes.

Based on the above solution, the multi-channel ultrasonic flowmeter further comprises plastic covers, wherein the plastic covers are arranged in the second round holes and are located above the compression rings, first sealing rings are arranged between the plastic covers and the second round holes, a cylinder convexly extending downwards is formed in the middle of each plastic cover and has a tail end provided with an external thread, the cylinders are in threaded connection with threaded holes in the stationary posts, lead-sealed holes are formed in the plastic covers, and second lead-sealed holes are formed in the pipe housing.

The invention has the following beneficial effects:

1. Two sets of multi-channel transducers used in pairs are formed, and two or more pairs of transducers can be configured in each set to adapt to pipes having different diameters; and the laminar flow can be more accurately measured through more transducers. In addition, one set of transducers can serve as standbys, so that the safety and reliability of the flowmeter are improved.

2. The stationary posts are provided with the key-shaped positioning protrusions matched with the key grooves, so that the stationary posts are accurately positioned and are prevented from rotating.

3. Dual sealing, including lateral sealing based on O-shaped silica gel rings and compression sealing based on polytetrafluoroethylene gaskets, is adopted, and uniquely, the polytetrafluoroethylene gaskets only seal a narrow gap formed between the posts of the transducers and the installation holes and are located at the center of the polytetrafluoroethylene gaskets. The disc springs press against the polytetrafluoroethylene gaskets, and the polytetrafluoroethylene gaskets can adapt to a high-temperature (up to 220° C.) and high-pressure (up to 5 PMa) condition in an alternate cooling and heating environment for a long time without aging, thereby having a service life for dozens of years.

4. The stationary posts adopt an optimized sealing structure and are simple in structure and small in size, and the installation holes are small so that the stationary posts of the transducers can be arranged close to the flanges at the two ends of the pipe housing; and the distance from connection wires of the transducers to the projections in the fluid flow direction are maximized under a fixed length of the pipe housing, so that the metering accuracy and range ratio of the flowmeter are improved.

5. The transducers are pressed by the elastic steel wire rings so as to be bucked and fastened, thereby being easy to assemble and disassembled; and all the parts are well sealed.

DETAILED DESCRIPTION OF THE INVENTION

The technical solution of the invention is further explained below with reference to the accompanying drawings of an illustrative embodiment of the invention.

Figure 1:
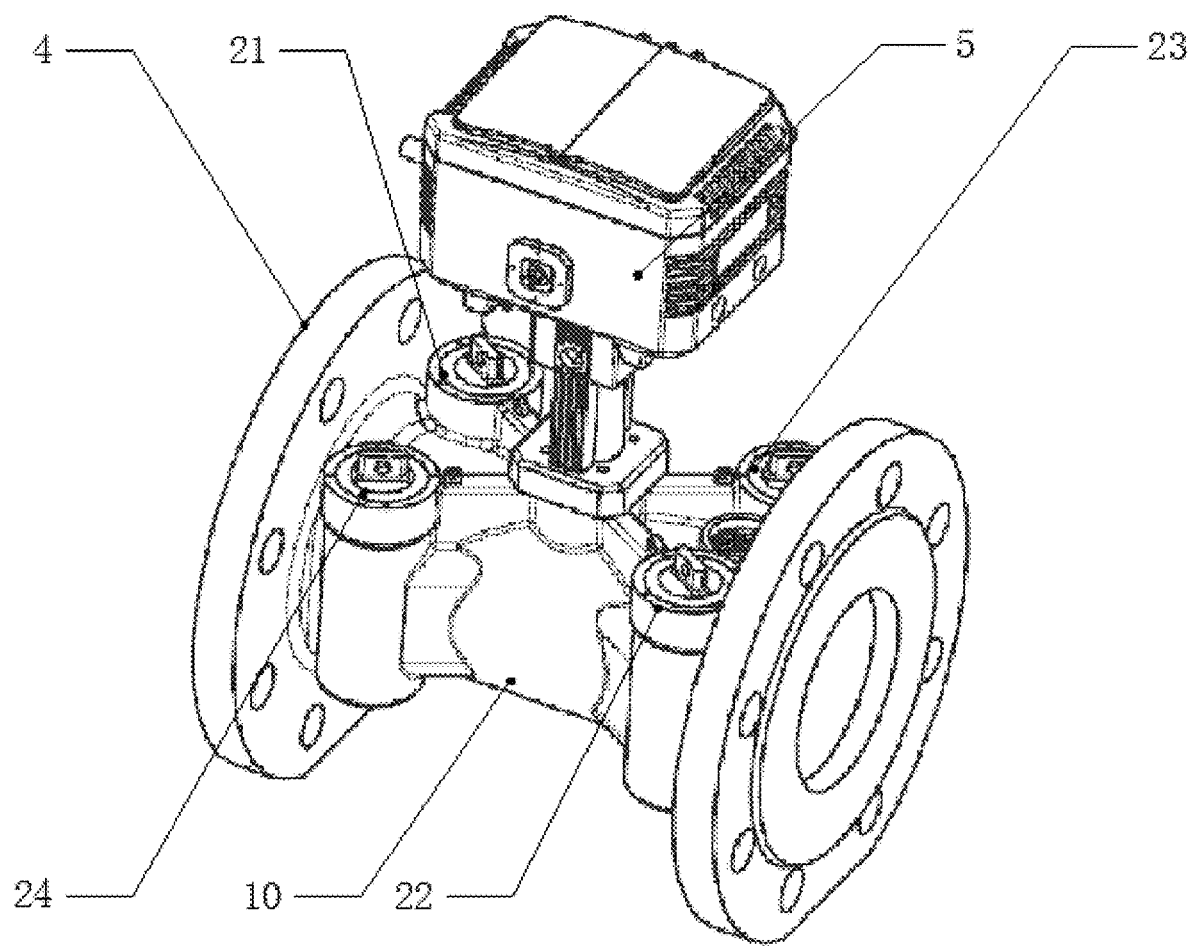
FIG. 1 is a structural view of a multi-channel ultrasonic flowmeter of the invention.
Figure 2:
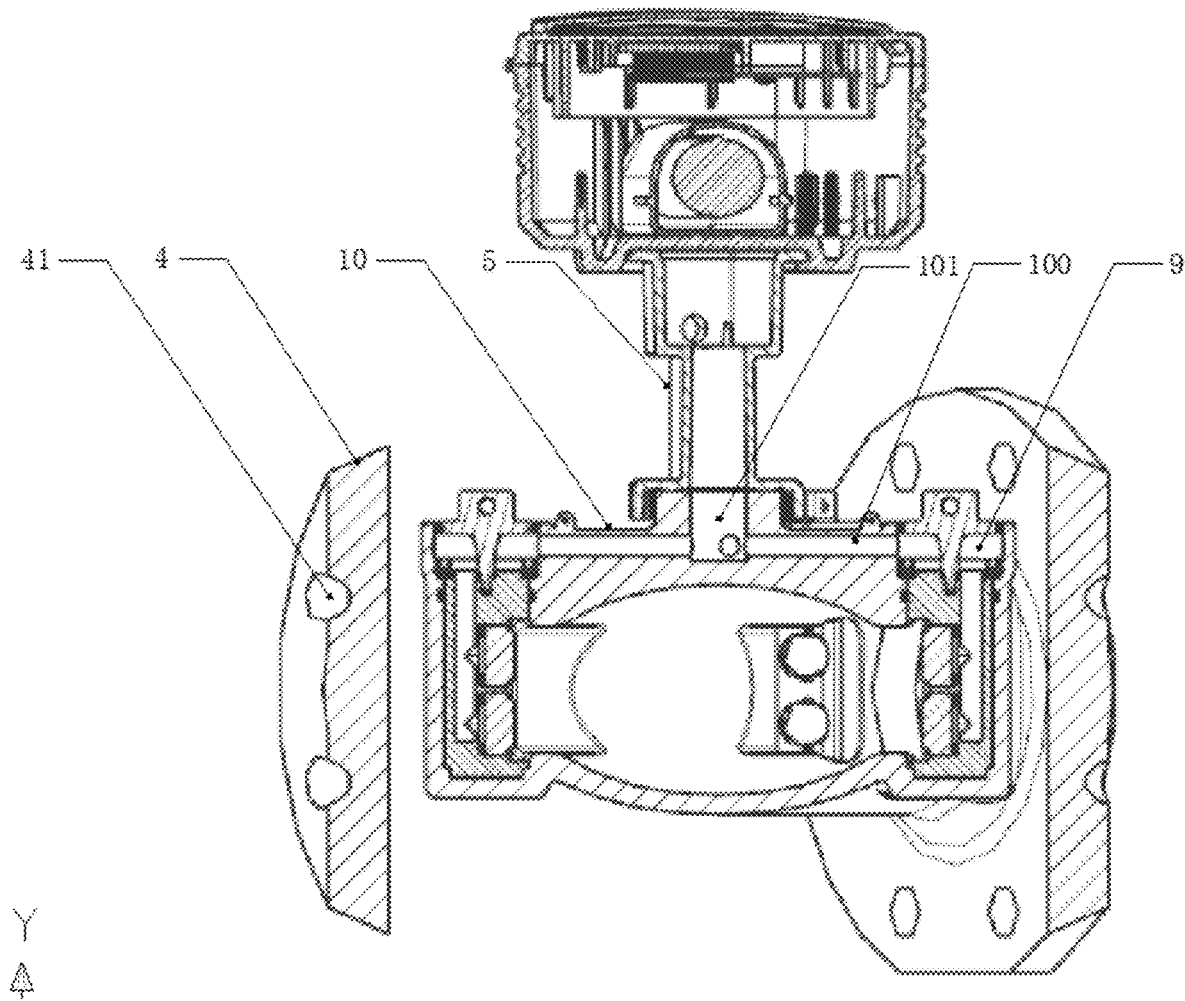
FIG. 2 is slant sectional view of an embodiment of the multi-channel ultrasonic flowmeter.

As shown in FIG. 1, a multi-channel ultrasonic flowmeter comprises transducer assemblies 21, 22, 23, 24 and a pipe housing 10, wherein the transducer assembly 21 and the transducer assembly 22 are used in pairs, the transducer assembly 23 and the transducer assembly 24 are used in pairs, flanges 4 are separately arranged at two ends of the pipe housing 10 and are provided with bolt holes 41, and a pipe is connected into the pipe housing 10 with bolts, so that the flow rate in the pipe is measured. As shown in FIG. 2, four transducer assembly installation holes 9 are formed in the two ends of the pipe housing 10 close to the flanges 4 and are separately located at a left end and a right end of the pipe housing 10. The transducer assembly installation holes 9 are used for installing and positioning the transducer assemblies and are arranged perpendicular to the pipe housing 10. In order to increase the range ratio, the transducer assembly installation holes 9 should be arranged as close as possible to the flanges.

Figure 4:
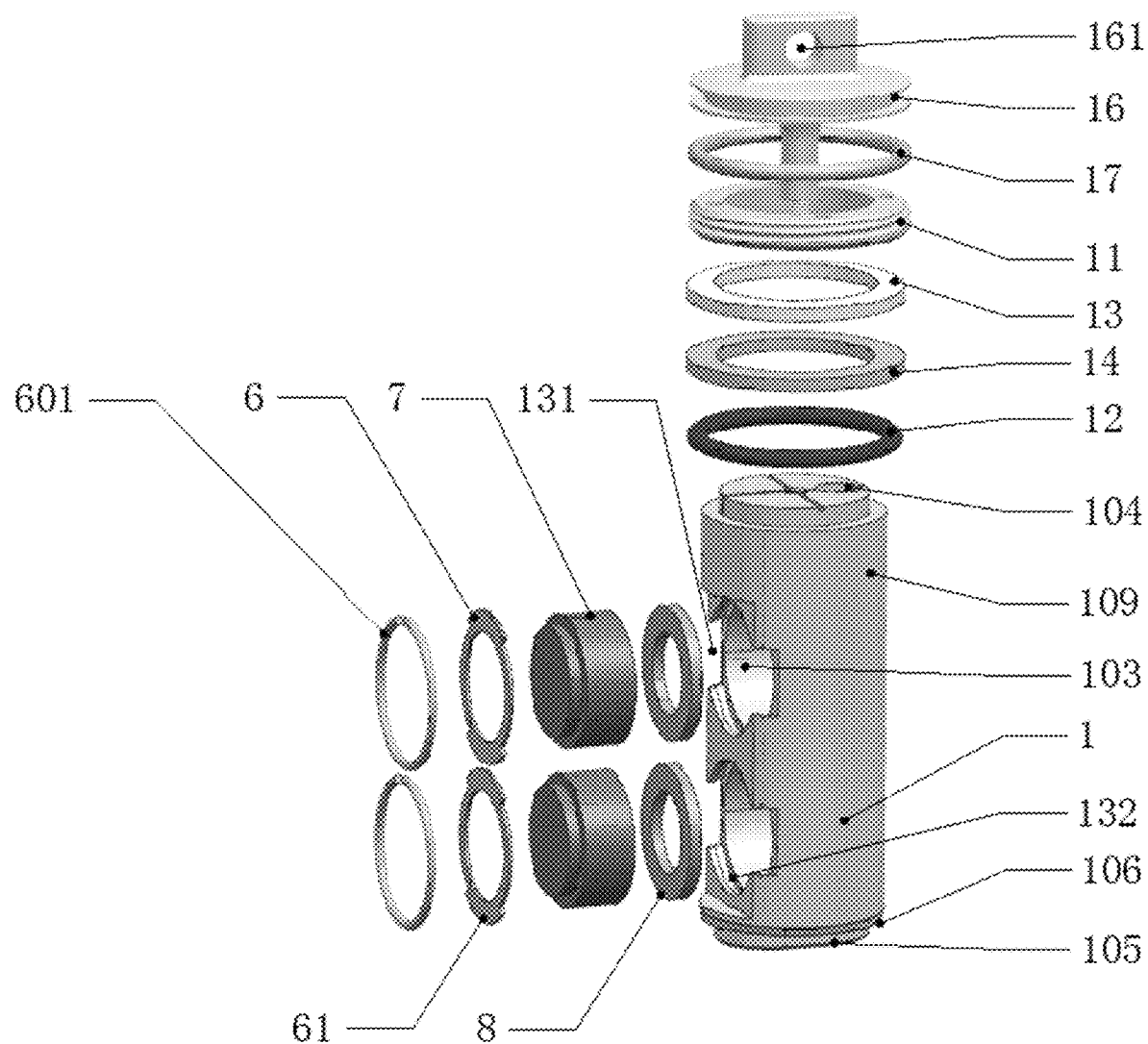
FIG. 4 is a schematic diagram of the transducer assembly.
Figure 5:
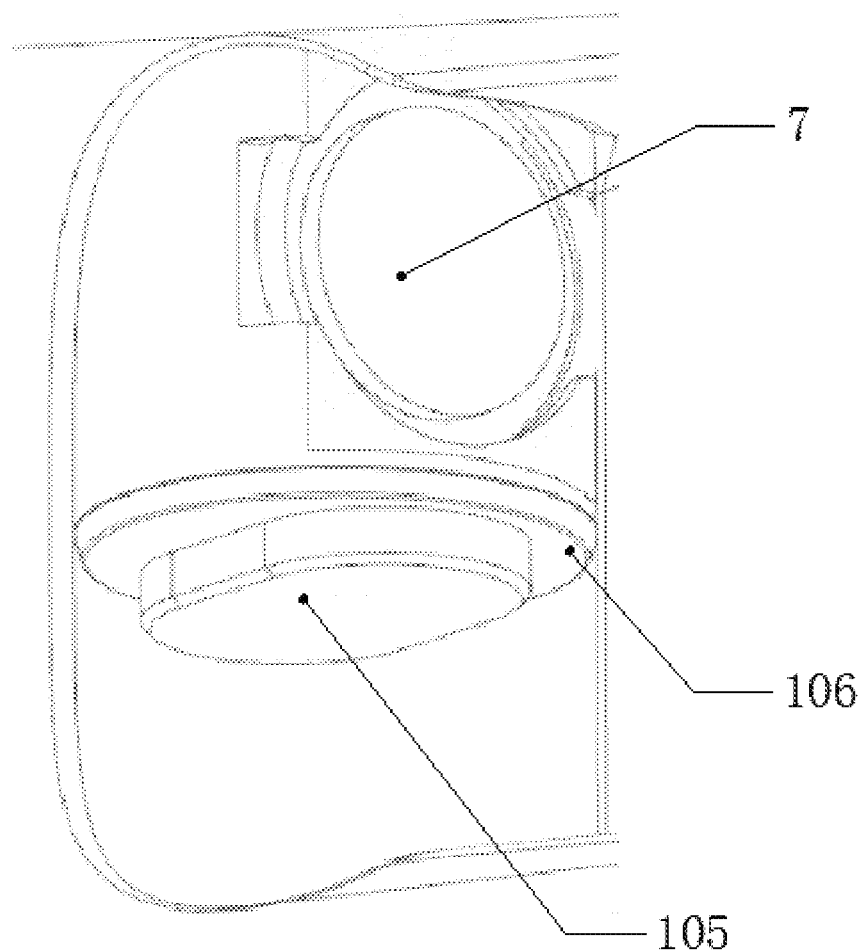
FIG. 5 is a partially enlarged view of a lower side of the transducer assembly.

As shown in FIG. 4, the transducer assemblies comprise transducers 7 and stationary posts 1, two first installation holes 103 are formed in the middle of each stationary post 1, and the transducers 7 are installed in the first installation holes 103.

Each of the four transducer assemblies is provided with two transducers 7, so that four ultrasonic channels are formed. On the one hand, comparative measurement of the fluid flow can be achieved through the four ultrasonic channels, and a more accurate flow value is obtained through arithmetic round-off and calculation, thus, improving the accuracy of the flowmeter; and on the other hand, certain transducers 7 can serve as standbys to be used when one pair of transducers cannot work normally, thus, improving the reliability of the flowmeter. Two or more pairs of transducers can be configured in each set to adapt to pipes having different diameters, and the laminar flow can be more accurately measured through more transducers. In addition, one set of the transducers can be used as standbys, so that the safety and reliability of the flowmeter are improved.

Figure 3:
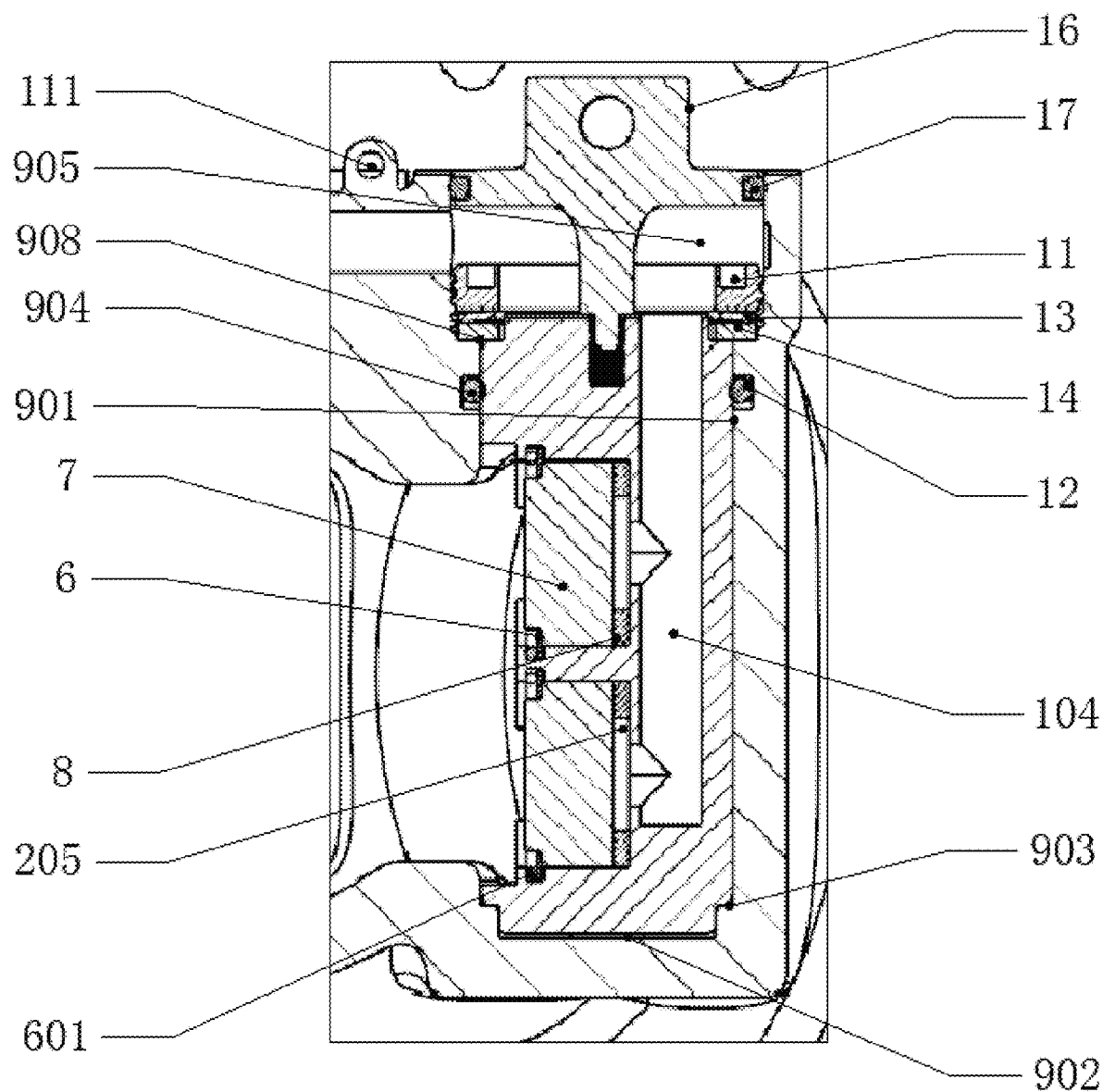
FIG. 3 is a partially enlarged view of the installation of a transducer assembly in FIG. 2.

Installation and positioning of the transducers 7: as shown in FIG. 3 and FIG. 4, in order to conveniently fix the transducers 7 into the first installation holes 103, each transducer assembly further comprises a circular compression piece 6 and an elastic steel wire ring 601. Protrusions 61 extending outwards in a radial direction are symmetrically formed on a left side and a right side of each circular compression piece 6. First installation faces 205 are formed in the first installation holes 103, and the first installation holes 103 are formed with second circular grooves 132 and second rectangular grooves 131, wherein the size of the second rectangular grooves 131 should be greater than or equal to that of the protrusions 61. The elastic rings 601 are circular rings, have an outer diameter greater than that of the second circular grooves 132 in a natural state and are compressed when installed in the second circular grooves 132. Bosses are arranged at transmitting ends of the transducers 7, and the bosses are cylindrical and have a diameter smaller than or equal to an internal bore diameter of the circular compression pieces 6. The other ends of the transducers 7 are attached to the first installation faces 205, so that the transducers are accurately positioned in the axial direction. In the installation process, the circular compression pieces 6 are disposed around the transmitting ends of the transducers 7 first, the protrusions 61 are accurately placed into the second rectangular grooves 131 and are then rotated by 90° to be disposed into the second circular grooves 132, and afterwards, the elastic rings 601 are installed in the second circular grooves 132 and press against the protrusions 61, so that the circular compression pieces 6 and the transducers 7 are tightly pressed and fastened on the first installation faces 205.

Sealing of the transducers 7: in order to prevent liquid from leaking via gaps between the transducers 7 and the first installation holes 103, first sealing gaskets 8 are arranged between the first installation faces 205 and the transducers 7. The first sealing gaskets 8 are usually silica gel gaskets and can be compressed by the circular compression pieces 6 and the elastic rings 601. The sealing effect can be improved with the increase of the pipe pressure.

Limitation of rotation of the stationary posts 1 around axes thereof: as shown in FIG. 3 and FIG. 4, each stationary post 1 is provided with a first cylindrical body 109 located on an upper portion of the stationary post 1, a lower portion of the stationary post 1 is provided with a key-shaped protrusion 105 extending in an axial direction, and a first positioning step surface 106 is formed between the key-shaped protrusion 105 and a body of the stationary post 1. As shown in FIG. 3, each transducer assembly installation hole 9 comprises a first round hole 901 and a key groove 902, wherein the first round hole 901 is located on an upper portion of the transducer assembly installation hole 9, and a bottom end of the transducer assembly installation hole 9 is formed with the key groove 902 and is provided with a second positioning step surface 903. The key grooves 902 are matched with the key-shaped protrusions 105, and the maximum length of the key grooves 902 is smaller than the diameter of the first round holes 901. After the stationary posts 1 are installed in the transducer assembly installation holes 9, the first round holes 901 are matched with the first cylindrical bodies 109, and the key-shaped protrusions 105 are matched with the key grooves 902 at the same time, so that rotation of the stationary posts 1 around axes thereof is limited. The degree of freedom of rotation of the stationary posts 1 is limited by the key-shaped positioning protrusions 105, so that positioning accuracy is high, rotational displacement of the stationary posts 1 is avoided, and signals can be stably transmitted and received between the transducers 7.

Axial positioning of the stationary posts 1: upper portions of the transducer assembly installation holes 9 are broached to form second round holes 905, and third positioning step surfaces 908 are formed between the second round holes 905 and the first round holes 901. After the stationary posts 1 are installed in the transducer assembly installation holes 9, the first positioning step surfaces 106 are attached to the second positioning step surfaces 903 of the transducer assembly installation holes 9. In order to fulfill axial positioning, upper end faces of the stationary posts 1 are flush with the third positioning step surfaces 908 and are compressed by compression rings 11 in threaded connection with the second round holes 905, so that the stationary posts 1 are prevented from moving upwards or downwards around axes thereof.

Sealing of the stationary posts 1: as shown in FIG. 3 and FIG. 4, the multi-channel ultrasonic flowmeter further comprises second sealing rings 12, polytetrafluoroethylene gaskets 14, disc springs 13 and compression rings 11, wherein the compression rings 11 are in threaded connection with the second round holes 905 to press the polytetrafluoroethylene gaskets 14 and the disc springs 13 against the upper end faces of the stationary posts 1 and the third positioning step surfaces 908, the disc springs 13 are located above the polytetrafluoroethylene gaskets 14, circular grooves 904 are formed in the first round holes 901, and the second sealing rings 12 are arranged in the circular grooves 904. The multi-channel ultrasonic flowmeter has the unique feature that the polytetrafluoroethylene gaskets 14 only seal a circular narrow gap formed between the stationary posts 1 and the corresponding faces of the first round holes 901 and are located at the center of the polytetrafluoroethylene gaskets 14 in a width direction. The disc springs 13 press against the polytetrafluoroethylene gaskets 14. The polytetrafluoroethylene gaskets 14 can adapt to a high-temperature (up to 220° C.) and high-pressure (up to 5 PMa) condition in an alternate cooling and heating environment for a long time without aging, thereby having a service life for dozens of years. This sealing structure is compact and is superior to the prior art in the following aspects: the outer circumference of the upper portions of the stationary posts 1 is small, and accordingly, the transducer assembly installation holes 9 are small, so that the transducer assemblies can be arranged as close as possible to the flanges 4, the distance from the connection wires of the transducers to the projections in the fluid flow direction are maximized under a fixed length of the pipe housing, and accordingly, the metering accuracy and range ratio of the flowmeter are improved.

Wiring of the transducers 7: as shown in FIG. 2, a circuit box 5 is arranged outside the pipe housing 10, and a controller is arranged in the circuit box 5. A wire hole 101 and four wiring holes 100 are formed in the pipe housing 10, wherein the wire hole 101 is perpendicular to the pipe housing 10, and is communicated with the circuit box 5, and the four transducer assembly installation holes 9 are communicated with the wire hole 101 via the four wiring holes 100. As shown in FIG. 4, wire guide holes 104 are formed in the upper portions of the stationary posts 1 and are communicated with the first installation holes 103. Wires of the transducers 7 are led into the wire guide holes 104 via the first installation holes 103 and finally are led out of the upper ends of the stationary posts 1. After being led out of the upper ends of the stationary posts 1, the wires enter the transducer assembly installation holes 9 and then enter the wire hole 101 via the wiring holes 100 to be connected to the controller in the circuit box 5.

Based on the above technical solution, the multi-channel ultrasonic flowmeter further comprises plastic covers 16, as shown in FIG. 3. The plastic covers 16 are arranged in the second round holes 905 and are located above the compression rings 11, and first sealing rings 17 are arranged between the plastic covers 16 and the second round holes 905. A cylinder convexly extending downwards is formed in the middle of each plastic cover 16 and has a tail end provided with an external thread. The cylinders are in threaded connection with threaded holes in the stationary posts 1. Lead-sealed holes 161 are formed in the plastic covers 16. Second lead-sealed holes 111 are formed in the pipe housing 10. When the transducer assemblies need to be disassembled to maintain or repair the flowmeter, the plastic covers 16 are disassembled first, then the compression rings 11 are disassembled, and afterwards, the plastic covers 16 are assembled; and because the plastic covers 16 are in threaded connection with the stationary posts 1, the plastic covers 16 and the stationary posts 1 can be taken out together by pulling the plastic covers 16, and transducer assemblies are conveniently disassembled.

Figure 6:
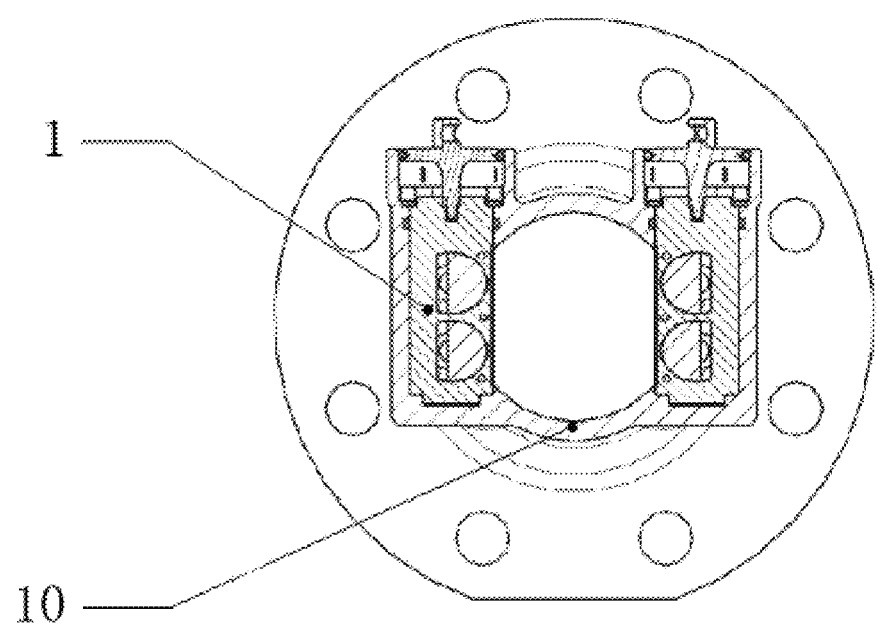
FIG. 6 is cross-sectional view of a pipe housing.

Due to the fact that the stationary posts 1 arranged in the pipe housing 10 may influence the flow rate to a certain extent, the positions of the stationary posts 1 should be kept a certain distance away from the center of the pipe housing 10. As shown in FIG. 6, experiments show that when the pipe housing 10 has a diameter of 50 mm, the distance from the contour lines of the stationary posts 1 in an inner hole of the pipe housing 10 to lines parallel to the contour lines and tangent to the inner hole of pipe housing 10 on the stationary post 1 side should be 8 mm, otherwise, a turbulent flow formed under the effect of the stationary posts 1 will fluctuate, which in turn affects the calculation accuracy of a time difference of ultrasound transmission by the transducers. Pipe housings having a diameter greater than 50 mm should also meet this condition in principle. As for pipe housings 10 having a small diameter, because the stationary posts 1 can easily avoid flange installation holes, the diameter of such pipe housings 10 should be smaller than 8 mm.

It would be understood that although certain embodiments of the invention are illustrated and described above, various alterations, modifications, substitutes and transformations of these embodiments can be made by those ordinarily skilled in this field without deviating from the principle and spirit of the invention. The scope of the invention is defined by the claims and equivalents thereof.

What is claimed is:

1. A multi-channel ultrasonic flowmeter, comprising transducer assemblies (21, 22, 23, 24) and a pipe housing (10), wherein flanges (4) are separately arranged at two ends of the pipe housing (10) and are provided with bolt holes (41), and four transducer assembly installation holes (9) are formed in the two ends of the pipe housing (10) close to the flanges (4);

each said transducer assembly comprises two transducers (7) and a stationary post (1), wherein two first installation holes (103) are formed in a middle of the stationary post (1), and the two transducers (7) are installed in the first installation holes (103);

each said transducer assembly further comprises a circular compression piece (6) and an elastic ring (601); protrusions (61) extending outwards in a radial direction are symmetrically formed on two sides of each said circular compression piece (6), first installation faces (205) are formed in the first installation holes (103), bosses are arranged at transmitting ends of the transducers (7), other ends of the transducers (7) are attached to the first installation faces (205), the circular compression pieces (6) are installed in the first installation holes (103), and the protrusions (61) and the elastic rings (601) are installed in the first installation holes (103);

first sealing gaskets (8) are arranged between the first installation faces (205) and the transducers (7);

upper portions of the stationary posts (1) are provided with first cylindrical bodies (109), lower portions of the stationary posts (1) are provided with flat key-shaped protrusions (105) extending in an axial direction, first positioning step surfaces (106) are formed between the flat key-shaped protrusions (105) and the stationary posts (1), the transducer assembly installation holes (9) comprise first round holes (901) and key grooves (902), the first round holes (901) are formed in upper portions of the transducer assembly installation holes (9), bottom ends of the transducer assembly installation holes (9) are formed with the key grooves (902) and are provided with second positioning step surfaces (903), and the key grooves (902) are matched with the flat key-shaped protrusions (105);

the upper portions of the transducer assembly installation holes (9) are broached to form second round holes (905), and third positioning step surfaces (908) are formed between the second round holes (905) and the first round holes (901);

the multi-channel ultrasonic flowmeter further comprises second sealing rings (12), polytetrafluoroethylene gaskets (14), disc springs (13) and compression rings (11), the compression rings (11) are in threaded connection with the second round holes (905) and sequentially press the polytetrafluoroethylene gaskets (14) and the disc springs (13) against upper end faces of the stationary posts (1) and the third positioning step surfaces (908), circular grooves (904) are formed in the first round holes (901), and the second sealing rings (12) are arranged in the circular grooves (904);

the multi-channel ultrasonic flowmeter comprises a circuit box (5) arranged outside the pipe housing (10), an integrator is arranged in the circuit box (5), a wire hole (101) and four wiring holes (100) are formed in the pipe housing (10), the wire hole (101) is perpendicular to the pipe housing (10) and is communicated with the circuit box (5), the four transducer assembly installation holes (9) are communicated with the wire hole (101) via the four wiring holes (100), and wire guide holes (104) are formed in the upper portions of the stationary posts (1) and are communicated with the first installation holes (103).

2. The multi-channel ultrasonic flowmeter according to claim 1, wherein the multi-channel ultrasonic flowmeter further comprises plastic covers (16) arranged in the second round holes (905) and located above the compression rings (11), first sealing rings (17) are arranged between the plastic covers (16) and the second round holes (905), a cylinder convexly extending downwards is formed in a middle of each said plastic cover (16) and has a tail end provided with an external thread, the cylinders are in threaded connection with threaded holes in the stationary posts (1), lead-sealed holes (161) are formed in the plastic covers (16), and second lead-sealed holes (111) are formed in the pipe housing (10).

* * * * *